United States Patent
Barrau

(10) Patent No.: US 11,092,541 B2
(45) Date of Patent: Aug. 17, 2021

(54) METHOD FOR DETERMINING A VALUE QUANTIFYING THE EFFECT OF AN OPTICAL FILTER ON A PARAMETER LINKED TO AN EYE

(71) Applicant: ESSILOR INTERNATIONAL, Charenton-le-Pont (FR)

(72) Inventor: Coralie Barrau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 170 days.

(21) Appl. No.: 16/081,368

(22) PCT Filed: Mar. 3, 2017

(86) PCT No.: PCT/EP2017/055054
§ 371 (c)(1),
(2) Date: Aug. 30, 2018

(87) PCT Pub. No.: WO2017/149140
PCT Pub. Date: Sep. 8, 2017

(65) Prior Publication Data
US 2019/0094135 A1    Mar. 28, 2019

(30) Foreign Application Priority Data
Mar. 4, 2016 (EP) .................................. 16158842

(51) Int. Cl.
*G01N 21/31* (2006.01)
*G02C 7/10* (2006.01)
*G01N 21/17* (2006.01)

(52) U.S. Cl.
CPC ............. *G01N 21/314* (2013.01); *G02C 7/10* (2013.01); *G02C 7/104* (2013.01); *G01N 2021/1748* (2013.01)

(58) Field of Classification Search
CPC ...................................................... G01N 21/314
(Continued)

(56) References Cited

U.S. PATENT DOCUMENTS

| 4,247,177 A | * | 1/1981 | Marks | G02C 7/104 351/44 |
| 5,774,202 A | * | 6/1998 | Abraham | A61F 2/1659 351/159.24 |

(Continued)

FOREIGN PATENT DOCUMENTS

| CN | 103688145 | 3/2014 |
| CN | 104011532 | 8/2014 |

(Continued)

OTHER PUBLICATIONS

Arnault et al., "Phototoxic Action Spectrum on a retinal Pigment Epithelium model of Age-Related macular Degeneration Exposed to Sunlight Normalized Conditions," *PLoS One*, 2013, 8(8):e71398.

(Continued)

*Primary Examiner* — Tarifur R Chowdhury
*Assistant Examiner* — Omar H Nixon
(74) *Attorney, Agent, or Firm* — Norton Rose Fulbright US LLP

(57) ABSTRACT

The invention relates to a method for determining a value quantifying the effect of an optical filter on a parameter linked to an eye, this optical filter blocking at least partially the transmission of light over a predetermined wavelength range, comprising the following steps: a) at least one spectral feature of the optical filter related to the transmittance of this optical filter at at least one wavelength in said predetermined wavelength range is provided, b) the value quantifying the effect of the optical filter on said parameter is calculated as a function of said at least one spectral feature of the optical filter provided in step a).

20 Claims, 2 Drawing Sheets

(58) Field of Classification Search
USPC .......................................................... 356/407
See application file for complete search history.

(56) References Cited

U.S. PATENT DOCUMENTS

| | | | | |
|---|---|---|---|---|
| 5,838,419 | A * | 11/1998 | Holland | A61F 2/1613 351/159.78 |
| 2004/0075810 | A1 * | 4/2004 | Duha | G02B 5/20 351/159.24 |
| 2005/0072908 | A1 * | 4/2005 | Grunert | G01J 3/51 250/226 |
| 2006/0132641 | A1 * | 6/2006 | Hayakawa | G02B 5/208 348/342 |
| 2006/0238703 | A1 * | 10/2006 | Ramos | G02C 7/04 351/159.78 |
| 2008/0278807 | A1 * | 11/2008 | Richards | G02C 7/104 359/464 |
| 2010/0277687 | A1 * | 11/2010 | Shehadeh | G02C 7/101 351/158 |
| 2012/0200847 | A1 | 8/2012 | Hall | |
| 2013/0057724 | A1 * | 3/2013 | Miyahara | H04N 9/045 348/223.1 |
| 2014/0268025 | A1 | 9/2014 | Legerton | |
| 2015/0309335 | A1 * | 10/2015 | Li | G02B 1/18 351/159.65 |
| 2016/0063303 | A1 * | 3/2016 | Cheung | A61B 3/113 382/103 |
| 2016/0320621 | A1 * | 11/2016 | Biteau | G02C 7/108 |

FOREIGN PATENT DOCUMENTS

| | | |
|---|---|---|
| EP | 2607884 | 6/2013 |
| JP | 2014513818 | 6/2014 |
| JP | 2015097638 | 5/2015 |
| JP | 2015520412 | 7/2015 |
| WO | WO 2009/017104 | 2/2009 |
| WO | WO 2015/179538 | 11/2015 |

OTHER PUBLICATIONS

Essilor International: "Maximizing Protection from Ultraviolet Radiation, Hazards: Assessing the Risks; Finding Solutions" Crizal Technical Paper, Apr. 30, 2012, URL: < HTTP://www.espf.com/wp-contentn/uploads/2012/04/Maximizing-Protection-from-Ultraviolet-Radiation-Hazards-Assessing-the-Risks-Finding-Solutions.pdf >.

Ham et al., "Retinal Sensitivity to damage from short wavelength light," *Nature*, 1976, 260:153-155.

International Search Report and Written Opinion issued in International Patent Application No. PCT/EP2017/055054, dated May 26, 2017.

Office Action issued in Corresponding Chinese Patent Application No. 201780014895, dated May 22, 2019 (No Translation Available).

Office Action issued in Corresponding Japanese Application No. 2018-545957, dated Feb. 9, 2021 (Machine Translation).

* cited by examiner

US 11,092,541 B2

METHOD FOR DETERMINING A VALUE QUANTIFYING THE EFFECT OF AN OPTICAL FILTER ON A PARAMETER LINKED TO AN EYE

CROSS-REFERENCE TO RELATED APPLICATIONS

This application is a national phase application under 35 U.S.C. § 371 of International Application No. PCT/EP2017/055054 filed 3 Mar. 2017, which claims priority to European Patent Application No. 16158842.1 filed 4 Mar. 2016. The entire contents of each of the above-referenced disclosures is specifically incorporated by reference herein without disclaimer.

TECHNICAL FIELD OF THE INVENTION

The invention relates to a method for determining a value quantifying the effect of an optical filter on a parameter linked to an eye.

BACKGROUND INFORMATION AND PRIOR ART

The electromagnetic spectrum covers a wide range of wavelengths, including wavelengths visible to the human eye from 380 nanometers to 780 nanometers (nm), thereafter designated as the visible spectrum.

Many studies indicate that, while some wavelengths of the electromagnetic spectrum have beneficial effects on the eye, others, including some wavelengths of the visible spectrum have harmful effects on the eye.

In particular, studies have shown that exposure of the eyes to visible light, and more specifically to a part of the blue-light spectrum could be linked to a higher risk of developing Age-Related Macular Degeneration (thereafter ARMD), which is one of the major cause of blindness in industrialized countries. Some of these studies are for example described in the paper titled "Phototoxic Action Spectrum on a retinal Pigment Epithelium model of Age-Related macular Degeneration Exposed to Sunlight Normalized Conditions", by authors Arnault, Barrau et al. published on Aug. 23, 2013 in the peer-reviewed journal PlosOne (plosone.org website).

Consequently, the effect of optical filters blocking at least partially the transmission of light to the eye for preventing the harmful effect of some wavelengths of the electromagnetic spectrum has been experimentally studied.

However, the experimental tests required to obtain reliable values quantifying the effect of these optical filters are complex, time-consuming, expensive and often need biological replicates. This method appears difficult to implement when a high number of optical filters has to be tested.

Especially, it would be desirable to compare and distinguish the effect on the eye of commercial ophthalmic lenses, especially those comprising a filter that is partially blocking blue light (or cutting blue light) without implementing all the experimental tests described above.

SUMMARY OF THE INVENTION

Therefore one object of the invention is to provide a new method for determining the effect of an optical filter on the eye in a simplified and quick way, without having to implement the experimental tests for each filter to be evaluated.

Another object of the invention is to provide a new method for determining the effect of filters that is usable and reliable even if evaluated filters have very different light cutting profiles (especially blue cutting profiles), such as filters with band-stop profile and/or high and low levels of cutting profiles in the selected wavelength range or on the contrary filters with continuously increasing or decreasing cutting profile.

Another object of the invention is to be able to finely quantify the effect of filters that are closely similar in terms of average transmission profile.

Another object of the invention is to provide a method applicable for blue cutting lenses that have average blue filtering rates lower than or equal to 50%, preferably lower than or equal to 40%, 35%, 30%, 25% in a predetermined range of wavelengths within 400-455 nm, that have high level of transmittance $T_V$ over the whole wavelength visible range, for example for lenses that have a transmittance level higher than or equal to 95%, preferably 96%, better 97%. The factor $T_V$ called relative transmission factor in the visible range should be understood as defined by the international normalized definition (ISO 13666: 1998 Standard) and is measured in accordance with the ISO 8980-3 Standard. It is defined in the wavelength range of from 380 to 780 nm.

It has been found that these goals can be achieved by calculating a value associated with a parameter linked to an eye using as input parameters specific spectral features related to the transmittance of the optical filter.

More precisely, the above objects are achieved solely or in combination according to the invention by providing a method for determining a value quantifying the effect of an optical filter on a parameter linked to an eye, this optical filter blocking at least partially the transmission of light over a predetermined wavelength range, comprising the following steps:

a) at least one spectral feature of the optical filter related to the transmittance of this optical filter at at least one wavelength in said predetermined wavelength range is provided, b) the value quantifying the effect of the optical filter on said parameter is calculated as a function of said at least one spectral feature of the optical filter provided in step a).

Thanks to the method according to the invention, the determination of the looked-for value is thus simple and quick, as it only requires providing a spectral feature of the optical filter, that can be easily measured or predetermined.

It is in particular an alternative to in vitro tests on eye cells or in vivo tests on animal eyes.

The effect of the optical filter on said parameter linked to an eye may therefore be determined based only on the filter, in an efficient and quick way.

In the method of the invention, the parameter linked to an eye is preferably a biological parameter.

In another embodiment of the invention, the parameter linked to an eye is a physiological parameter.

In the following part of the present application, the invention will be described in a non limitative way in reference with a biological parameter linked to the eye.

The value quantifying the effect of a given optical filter on said parameter linked to the eye is determined without any in-vitro or in-vivo tests on this given optical filter.

Other advantageous and non limiting features of the method according to the invention include the following:

in step a), said at least one spectral feature provided comprises an average transmittance over the whole predetermined wavelength range or over a reduced wavelengths range centered on a particular wavelength of said predetermined wavelength range, or a weighted average transmittance over the whole predetermined wavelength range or over a reduced wavelength range centered on a particular wavelength of said predetermined wavelength range;

in a specific embodiment, in step a), a plurality of spectral features comprising several transmittance values at set specific wavelengths is provided;

in step a), a plurality of spectral features of said optical filter is provided, comprising at least an average transmittance over the whole predetermined wavelength range, and several average transmittances over reduced wavelength ranges centered on different wavelengths of said predetermined wavelength range;

in step a), said at least one spectral feature provided comprises a weighted average transmittance over the whole predetermined wavelengths range or over a reduced wavelengths range centered on a particular wavelength of said predetermined wavelengths range, each value of the transmittance of the optical filter at a given wavelength being weighted by the corresponding value at the same given wavelength of the action spectrum of light in relation with the parameter linked to the eye such as a blue-light hazard function B(X);

said effect of the optical filter is a photoprotective effect of the optical filter against the negative action of blue light on the parameter linked to the eye and said wavelength range is comprised between 380 and 500 nanometers, preferably between 400 and 455 nanometers, preferably between 400 and 450 nanometers preferably between 415 and 455 nanometers, preferably between 420 and 450 nanometers;

said value quantifying the effect of said optical filter quantifies the reaction of the eye, in particular of the retina, to blue light;

in step a), said at least one spectral feature provided comprises a weighted average transmittance, each value of the transmittance of the optical filter at a given wavelength being weighted by the corresponding value of the blue light hazard function at the same given wavelength;

in step b), the value quantifying the effect of the optical filter on said parameter linked to the eye is calculated using a predetermined function associating said parameter linked to the eye to an optical parameter relative to the transmission of light through the optical filter to said eye;

the parameter is a biological parameter and, in step b), said predetermined function takes into account a set of experimental data comprising values of said parameter measured in vitro on eye cells or in vivo on an animal eye after their illumination by light comprising different ranges of wavelengths by putting optical filters in between light and eye cells;

in step b), said predetermined function is defined by determining a mathematical function whose curve fits said experimental data;

in step a), said value quantifying the effect of said optical filter is related to the reaction of the eye to blue light and, in step b), said predetermined function comprises a polynomial of order at least 2; and, said predetermined function comprises an average or weighted average of a plurality of mathematical functions, each of them depending on a physical parameter of the optical filter, and being determined by fitting the experimental data;

in step a), said at least one spectral feature provided comprises an average transmittance over a first predetermined wavelength range and a weighted average transmittance over a second predetermined wavelength range, and in step b), said predetermined function comprises an average or weighted average of two mathematical functions, each associating said parameter linked to the eye to one of the average transmittance over the first predetermined wavelength range and weighted average transmittance over the second predetermined wavelength range;

said biological parameter is related to the rate of apoptosis of the retinal pigment epithelium cells and said value quantifying the effect of said optical filter quantifies the reduction of the rate of apoptosis of the retinal cells linked to blue light exposure.

The invention also provides a method for determining a function for determining a value quantifying an effect of an optical filter on a parameter linked to the eye based on at least one spectral feature of this optical filter, this optical filter blocking at least partially the transmission of light over a predetermined wavelength range, comprising the following steps:

measuring said value quantifying the effect of each reference filter of a set of reference filters blocking at least partially the transmission of light over said predetermined wavelength range, by comparing the negative action of light on said parameter linked to the eye illuminated through each reference filter and illuminated directly without any filter, determining, for each reference filter, one or more spectral feature(s) of this reference filter related to its transmittance at at least one wavelength in said predetermined wavelengths range, determining said function by determining a mathematical function whose curve fits the measured values quantifying the effect of the reference filters as a function of the spectral feature of the corresponding reference filter or by determining a mathematical function comprising an average or weighted average of a plurality of mathematical functions, each of them depending on a physical parameter linked to said parameter linked to the eye, and being determined by fitting the experimental data.

The invention finally relates to a device for determining a value quantifying the effect of an optical filter on a parameter linked to an eye, this optical filter blocking at least partially the transmission of light over a predetermined wavelength range, comprising:

a device for providing at least one spectral feature of the optical filter related to the transmittance of this optical filter at at least one wavelength in said predetermined wavelength range, and a calculation unit programmed to determine the value quantifying the effect of the optical filter on said parameter by calculating it as a function of said at least one spectral feature of the optical filter provided in step a).

DETAILED DESCRIPTION OF EXAMPLE(S)

The following description, enriched with joint drawings that should be taken as non limitative examples, will help understand the invention and figure out how it can be realized.

In the description, unless specified, transmittance values, absorption values and photoprotection potency PP are expressed in percentages (values ranging from 0% to 100%).

Figure 3:
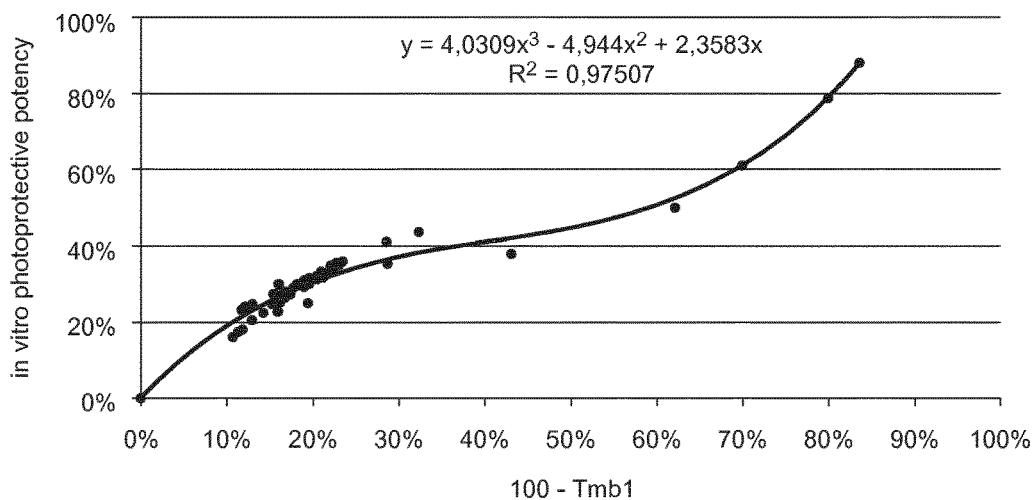
Figure 4:
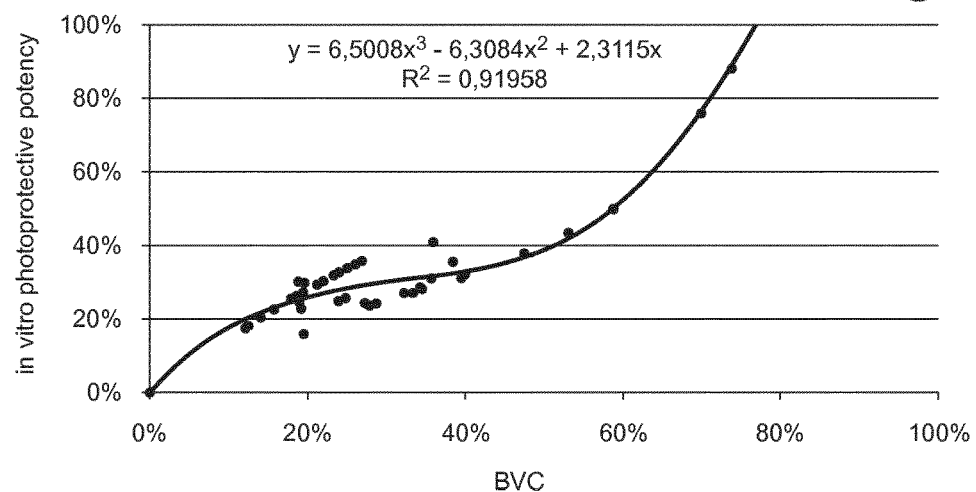
Figure 5:
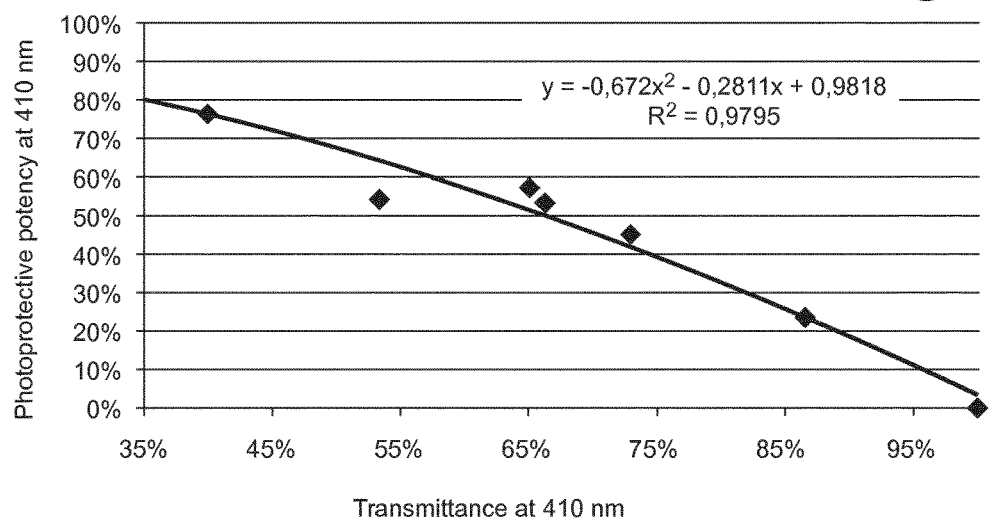

FIG. 3 is a graph showing values quantifying the effect on said biological parameter of a set of reference optical filters, as measured through an experimental in vitro procedure (dots) plotted against a first spectral feature of these optical filters linked to the average transmittance of these filters over 420-450 nm, 100%−AvT_tot(420-450 nm), here designated as 100-Tmb1, and the curve of a function for determining these values (line), FIG. 4 is a graph showing the values quantifying the effect on said biological parameter of a set of reference optical filter, as measured through an experimental in vitro procedure (dots) plotted against second spectral feature of these optical filters linked to the weighted transmittance of these filters over 400-450 nm, BVC(400-450 nm), and the curve of a function for determining these values (line), FIG. 5 is a graph showing the values quantifying the effect on said biological parameter of a set of reference optical filter, as measured through an experimental in vitro procedure (dots) plotted against a third spectral feature of these optical filters linked to the transmittance of these filters, at a set specific wavelength 410 nm, and the curve of a function for determining these values (line) for this specific wavelength, at limited filtering levels.

The method according to the invention allows determining a value quantifying the effect of an optical filter on a biological parameter linked to an eye.

As explained in the introduction, the light received by the eyes, either natural or artificial, may have a negative impact on the eye. More precisely, it has been known for a long time that light with an ultra-violet wavelength, for example in the range from 280 to 380 nanometers, may damage the eyes.

More recently, it has been shown that blue light with wavelengths in the range from 380 to 500 nanometers could be linked to a higher risk of developing Age-Related Macular Degeneration (thereafter ARMD).

Optical filters may be used to block at least partially the transmission of light over a predetermined wavelength range, for example in the UV range or blue light range described above.

These optical filters may for example be included in a pair of eyeglasses.

Thanks to these optical filters, the intensity of light having a wavelength in the range blocked by the filter is reduced when it reaches the eye. The light having these wavelengths may even be completely blocked before it reaches the eye.

The eye therefore receives a reduced amount of light at these blocked wavelengths, or even no light with these blocked wavelengths at all.

The harmful effects of light having the blocked wavelengths may thus be reduced or even eliminated.

In order to be able to assess the effect of a specific optical filter, or to compare the effect of two optical filters to determine which one is the more efficient to protect the eye from the harmful effects of light, it is possible to determine a value quantifying the effect of each optical filter on a biological parameter of the eye.

The invention provides therefore a method for determining a value quantifying the effect of an optical filter on a parameter linked to an eye, this optical filter blocking at least partially the transmission of light over a predetermined wavelength range, comprising the following steps:

a) at least one spectral feature of the optical filter related to the transmittance of this optical filter at at least one wavelength in said predetermined wavelength range is provided, b) the value quantifying the effect of the optical filter on said biological parameter is calculated as a function of said at least one spectral feature of the optical filter provided in step a).

The value quantifying the effect of the optical filter is generally related to the reduction of the harmful effect of light in said predetermined wavelength range on the eye.

In practice, the parameter linked to the eye is a biological parameter.

It may be expressed as a ratio between the value of said biological parameter linked to the eye observed after illumination of eye cells (in vitro) or animal eye (in vivo) with light having wavelengths in said predetermined wavelength range through the optical filter considered and the corresponding value of the same biological parameter of the eye observed after illumination of these eye cells (in vitro) or animal eyes with light having the same wavelengths without any optical filter.

Alternatively, it may be also expressed as a ratio of the difference of the value of said biological parameter linked to the eye observed after illumination of eye cells (in vitro) or animal eye (in vivo) of said eye, with light having wavelength in said predetermined wavelength range and without any optical filter, and the value of this biological parameter linked to the eye observed after illumination with light having wavelength in said predetermined wavelength range through the optical filter divided by this value of the biological parameter linked to the eye observed after illumination of this eye with light having the same wavelengths without any optical filter.

The experimental data referred to in the present application can be also implemented on human eye as far as the measurements of the parameter linked to the eye has no adverse effect on the human eye. Measurements in vitro on eye cell or in vivo on an animal eye are preferred.

The illumination is not necessarily limited to light in the spectral range of interest whose impact on the eye is searched for.

The illumination (or light exposure) can be made on a larger wavelength range of light that encompasses the spectral range of interest.

In an embodiment, said biological parameter is relative to light-induced oxidative stress onto the cells of the eye. More precisely, the biological parameter may be related either to
light-induced production of oxidative stress on the eye cells, or
light-induced reduction of defensive mechanisms against oxidative stress of the eye cells,
light-induced cell death, by apoptotic or necrosis ways.

The looked-for value then quantifies either the reduction of oxidative stress on the eye cells, or the limitation in reduction of the defensive mechanisms against oxidative stress, or the reduction of cell death.

In the example described here, the investigated harmful effect of light is the effect of blue light on the retina, more specifically on the outer retina, which is composed of retinal pigment epithelium (RPE) cells plus the outer segments of visual photoreceptors (rods and cones) and more precisely on retinal pigment epithelium cells (RPE). Said effect of the optical filter is a photoprotective effect against the negative action of blue light on the biological parameter linked to the eye.

The predetermined wavelength range is therefore comprised in the interval between 380 and 500 nanometers, preferably between 400 and 500 nanometers, preferably between 400 and 455 nanometers, preferably between 400 and 450 nanometers and more preferably between 420 and 450 nanometers.

Said value quantifying the effect of said optical filter quantifies here the reaction of the outer retina to blue light having wavelengths comprised in said predetermined wavelengths range.

In the example described here, the biological parameter is related to the rate of apoptosis of the retinal pigment epithelium cells. More precisely, it quantifies the reduction of the rate of apoptosis of the retina cells linked to blue light exposure or visible light exposure, as explained in more details below.

In the examples below, we will show how the method according to the invention allows determining the looked-for value corresponding to six optical filters A, B, C, D, E, F.

Figure 1:
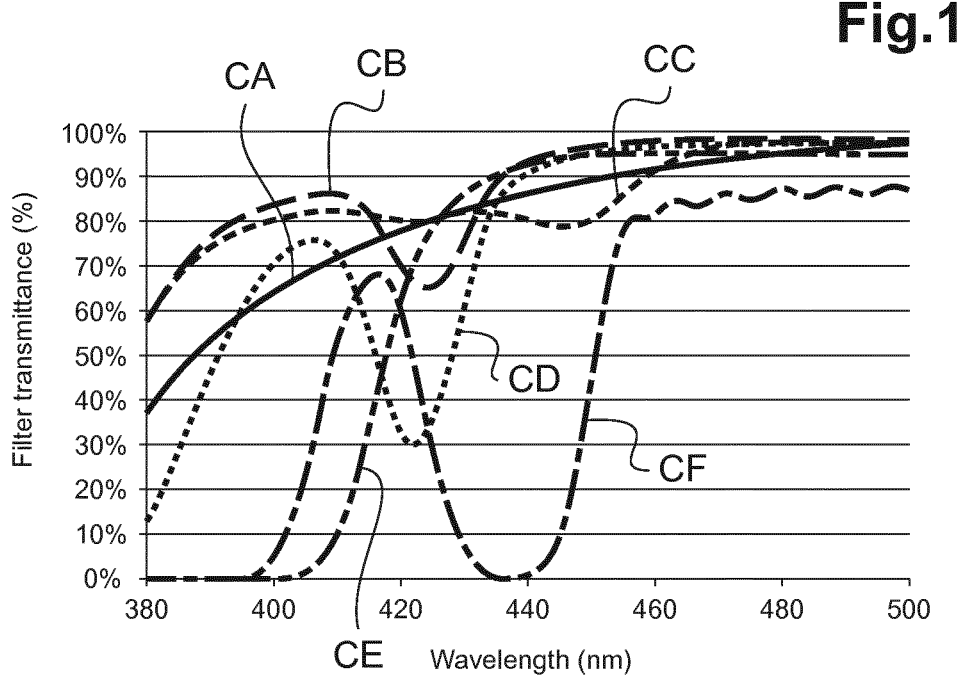
FIG. 1 is a graph showing the curves CA, CB, CC, CD, CE and CF of the transmittance of three examples of optical filters A, B, C, D, E, F as a function of the wavelength of the incident light.

FIG. 1 shows the curves of the transmittances of these six optical filters A to F, plotted against the wavelengths of the incident light, in said predetermined wavelengths range comprised between 380 and 500 nanometers. These curves will be called in the following the transmission spectra of the optical filters A to F.

As can be seen on FIG. 1, the optical filter A, C and E are longpass filters, whereas optical filters B, D and F are bandstop filters that cut off a specific band of wavelengths respectively centered on 424 (for B and D) and 440 (for F) nanometers, with an average full width at half maximum (FWHM) between 15 and 25 nanometers.

The transmittance $T(\lambda)$ of each filter at a given wavelength $\lambda$ is defined as the ratio between the intensity of the incident light arriving on the filter and the light transmitted by the optical filter at this wavelength, that is to say the intensity of the light emerging after having gone through the filter. It is therefore written as a percentage, 0% corresponding to the case where the filter is blocking all the light at the wavelength $\lambda$ and 100% corresponding to the case where the filter transmits all the light at the wavelength $\lambda$.

This transmittance curve may be measured through conventional methods with a spectrometer or may be predetermined.

In the first case, step a) comprises measuring the transmittance spectra of each optical filter A to F with a conventional spectrometer.

In the second case, step a) comprises retrieving the transmittance spectra of each optical filter from a database.

According to the invention, in step a), said at least one spectral feature provided is an average transmittance over the whole predetermined wavelength range or over a reduced wavelength range centered on a particular wavelength of said predetermined wavelength range, or a weighted average transmittance named BVC over the whole predetermined wavelength range or over a reduced wavelength range centered on a particular wavelength of said predetermined wavelength range.

In practice, the spectral feature is deduced from the transmittance spectrum of the corresponding optical filter.

For example, the average transmittance AvT_tot over the whole predetermined wavelength range may be determined based on the transmittance curve as measured by integration.

The average transmittance may for example be determined for the range between 400 and 455 nm, 415 and 455 nanometers, more preferably between 420 and 450 nanometers. This different averages will be noted, in the following, as AvT_tot(400-455 nm), AvT_tot(415-455 nm) and AvT_tot(420-450 nm).

The average transmittance AvT($\lambda$m) over a reduced wavelength range centered on the wavelength $\lambda$m of said predetermined wavelength range may for example be determined for ranges of 10 nanometers, centered on 400 nm, 410 nm, 420 nm, 430 nm, 440 nm and 450 nm, or determined for each center wavelength with a predetermined wavelength range of 1 nm.

The average transmittance AvT_tot($\lambda_1$-$\lambda_2$ nm) of the optical filter over a given wavelength range [$\lambda_1$; $\lambda_2$] comprised between two wavelengths values $\lambda_1$ and $\lambda_2$, with [$\lambda_1$; $\lambda_2$] in the range between 400-455 nm, or 415-455 nm, or 420-450 nm, or the average transmittance AvT($\lambda$m)($\lambda_3$-$\lambda_4$ nm) of the optical filter over a given narrow wavelength range [$\lambda_3$; $\lambda_4$] centered on the given wavelength $\lambda$m comprised between two wavelengths values $\lambda_3$ and $\lambda_4$, with [$\lambda_3$; $\lambda_4$] in the range between 400-455 nm, or 400-450 nm, or 415-455 nm, or 420-450 nm, is here determined as an integrated value, corresponding to the area under the curve.

More precisely, it is obtained through the following calculation:

$$\text{AvT\_tot}(\lambda 1 - \lambda 2 \text{ nm}) (\%) = \frac{\int_{\lambda_1}^{\lambda_2} T(\lambda) d\lambda}{\lambda_2 - \lambda_1}, \text{ or}$$

$$AvT(\lambda m) (\%) = \frac{\int_{\lambda_3}^{\lambda_4} T(\lambda) d\lambda}{\lambda_4 - \lambda_3},$$

where $T(\lambda)$ is the transmittance of the optical filter at wavelength $\lambda$, $\lambda$m is the wavelength on which the range [$\lambda_3$; $\lambda_4$] is centered. [$\lambda_3$; $\lambda_4$] is a narrow wavelength range, for example narrower than the wavelength range [$\lambda$1; $\lambda$2], that may be included in the larger wavelength range [$\lambda_1$; $\lambda_2$]

The spectral feature of the optical filter comprises for example an average transmittance AvT_tot(420-450 nm) of the optical filter over the whole wavelength range from 420 to 450 nm that will be used in the examples hereafter, and/or one or more average transmittance AvT($\lambda$m) of the optical filter over a 10 nanometers range centered on $\lambda$m, for the following wavelengths $\lambda$m: 400, 410, 420, 430, 440, 450 nm. In a specific embodiment that will be used in the example, AvT($\lambda$m) is defined for one wavelength $\lambda$m. In this case, the average transmittance AvT($\lambda$m) of the optical filter is integrated over a 1 nanometer range centered on $\lambda$m.

The spectral feature of each optical filter may also be determined as one hundred percent minus the average transmittance, calculated as 100%–AvT_tot($\lambda_1$-$\lambda_2$ nm) or 100%–AvT($\lambda$m), which represents the cut-off of light in the predetermined wavelength range by the optical filter.

The weighted average transmittance over the whole predetermined wavelength range or over a reduced wavelength range centered on a particular wavelength of said predetermined wavelength range may be calculated, for example, by weighting each value of the transmittance of the optical filter at a given wavelength by the corresponding value of the action spectrum of light, such as the blue-hazard function $B(\lambda)$, in relation with the parameter linked to the eye.

In the example described here, the value of the action spectrum of light in relation with the biological parameter linked to the eye may be obtained from a blue light-hazard function B, called in the following the blue-hazard function.

The blue-hazard function represents the relative spectral sensitivity of the human eye to blue light hazards. It is based upon the relative spectral effectiveness of optical radiation to induce retinal photochemical injury.

The blue-hazard function is a relative spectral effectiveness weighting function for retinal blue-light damage. A first proposal B1($\lambda$) for this blue-hazard function has been defined by ICNIRP (International Commission on Non Ionizing Radiation Protection), derived from the seminal work by Ham et al. for the acute hazard on aphakic monkey eyes, published under the title "Retinal sensitivity to damage from short wavelength light", by Ham et al., in Nature (1976), Vol. 260, 5547, pages 153-155.

Figure 2:
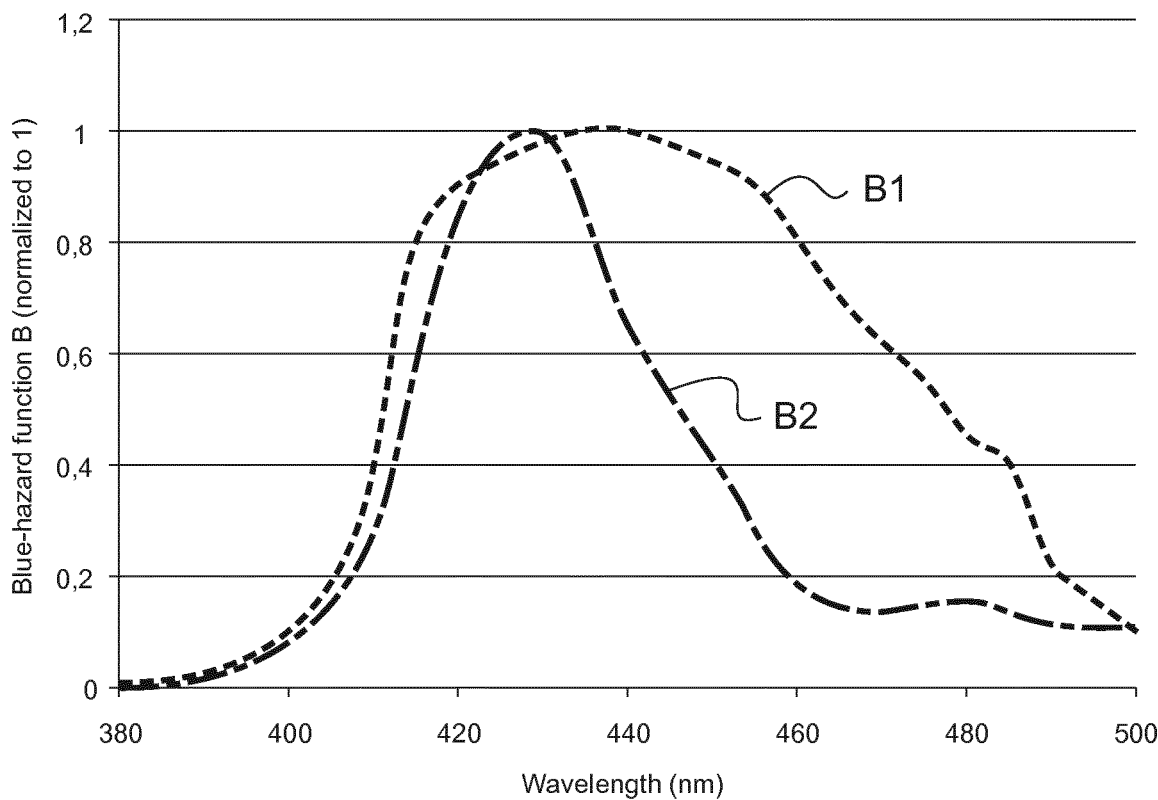
FIG. 2 is a graph showing the curves of different blue-hazard functions that can be taken into account in the method according to the invention.

The first blue-hazard function B1($\lambda$), whose curve is shown on FIG. 2, was defined by multiplying the spectral values of Ham et al.'s research with the spectral transmittance of the human crystalline lens.

A second proposal of blue-hazard function B2($\lambda$) may be derived from more recent studies, as published in "Phototoxic Action Spectrum on a Retinal Pigment Epithelium Model of Age-Related Macular Degeneration Exposed to Sunlight Normalized Conditions", by Arnault, Barrau et al published on Aug. 23, 2013 in the peer-reviewed journal PlosOne (plosone.org website). This second blue-hazard function B2($\lambda$) is also shown on FIG. 2.

The first and second blue-hazard functions B1 and B2 shown on FIG. 2 have similar increasing profiles with approximately the same maximum at around 430 nm. However, the second blue-hazard function B2 derived from more recent studies has a distinct and narrower decreasing profile.

In another embodiment, the blue-hazard function B1 or B2 can be weighted by the spectral distribution of the light source. The light source can be any light source including the sun or artificial light sources, More precisely, the weighted average transmittance over the wavelength range [$\lambda'_1$; $\lambda'_2$] BVC($\lambda'_1$-$\lambda'_2$ nm) may be calculated with the following formula:

$$BVC(\lambda'1 - \lambda'2 \text{ nm}) (\%) = 100\% - \frac{\int_{\lambda_1'}^{\lambda_2'} T(\lambda) \times B(\lambda) d\lambda}{\int_{\lambda_1'}^{\lambda_2'} B(\lambda) d\lambda}.$$

In an embodiment that will be used in the examples detailed hereafter, the values $\lambda'_1$=400 nm and $\lambda'_2$=450 nm and blue hazard function B2 defined herabove are used for the calculation of the weighted average transmittance BVC (400-450 nm).

Advantageously, in step a), a plurality of spectral features of said optical filter is provided, comprising at least two spectral features:

the average transmittance AvT_tot($\lambda_1$-$\lambda_2$ nm) over the whole predetermined wavelength range [$\lambda_1$; $\lambda_2$], and average transmittances AvT($\lambda$m) over reduced wavelength ranges [$\lambda_3$; $\lambda_4$] centered on different wavelengths $\lambda$m of said predetermined wavelength range or the weighted average transmittance BVC($\lambda'_1$-$\lambda'_2$ nm) over the predetermined wavelength range [$\lambda'_1$; $\lambda'_2$].

the use of the two features BVC($\lambda'_1$-$\lambda'_2$ nm) and 100%–AvT_tot($\lambda_1$-$\lambda_2$ nm), especially BVC(400-450 nm) and 100%–AvT_tot(420-450 nm) is one of the preferred embodiment.

It may also comprise the average weighted transmittance BVC($\lambda'_1$-$\lambda'_2$ nm) over the whole predetermined wavelength range, and/or over reduced wavelength ranges centered on different wavelengths of said predetermined wavelength range.

For example, for filters A to F, the spectral feature of each optical filter may comprise one or several of the information grouped in the following table

| | AvT_tot (420-450 nm) | 100% – AvT_Tot (420-450 nm) | BVC(400-450 nm) | AvT(400 nm) | AvT(410 nm) | AvT(420 nm) | AvT(430 nm) | AvT(440 nm) | AvT(450 nm) |
|---|---|---|---|---|---|---|---|---|---|
| A | 84% | 16% | 19% | 65% | 72% | 78% | 82% | 86% | 89% |
| B | 84% | 16% | 19% | 84% | 87% | 66% | 76% | 94% | 97% |
| C | 81% | 19% | 19% | 80% | 82% | 80% | 82% | 81% | 80% |
| D | 71% | 29% | 36% | 70% | 73% | 33% | 63% | 91% | 95% |
| E | 88% | 12% | 28% | 0 | 10% | 61% | 88% | 94% | 95% |
| F | 16% | 84% | 74% | 4% | 53% | 59% | 5% | 0% | 42% |

In step a), said weighted average transmittance BVC is then obtained by weighing each value of the transmittance of the filter at a given wavelength by the corresponding value of the blue hazard function.

The blue-hazard function B($\lambda$) taken into account to weight each value of the transmittance of the filter may coincide with the first B1 or the second B2 blue-hazard function described above.

The weighted average transmittance BVC over the whole predetermined wavelength range or over a reduced wavelength range centered on a particular wavelength of said predetermined wavelength range, that is to say over a wavelength range [$\lambda'_1$; $\lambda'_2$] comprised between two wavelengths values $\lambda'_1$ and $\lambda'_2$, with [$\lambda'_1$; $\lambda'_2$] in the range between 400-455 nm, or 400-450 nm or 415-455 nm, or 420-450 nm is for example determined as an integrated value, corresponding to the area under the curve.

In step b), the value quantifying the effect of the optical filter on said biological parameter is calculated using a predetermined function associating said biological parameter linked to the eye to an optical parameter relative to the transmission of light to said eye by putting the filter in between light and eye cells.

This optical parameter corresponds to the spectral feature determined in step a). More precisely, the spectral feature determined in step a) is the value of the optical parameter determined for the optical filter considered.

Thus, once the spectral feature of the optical filter is determined, said looked-for value quantifying the effect of the optical filter is determined through calculation, without in-vitro or in-vivo experiment.

Said predetermined function takes into account a set of experimental data comprising values of said biological parameter measured in retinal cells after illumination of these cells by light comprising different ranges of wavelengths.

More precisely, as described in more details later, said predetermined function is determined by determining at least one mathematical function whose curve fits said experimental data plotted against the corresponding optical parameter.

The mathematical function is determined by a regression analysis, for example using the least-square method. Examples of such mathematical functions are shown on FIGS. 3, 4 and 5. Each of these figures show the graph of experimental data (points) measured for different optical filters of a set of reference optical filters (as explained below), plotted against three different optical parameters corresponding to different spectral features.

The experimental data comprise a set of measured values quantifying the effect of the optical filter on the eye associated to the corresponding spectral feature of the optical filter considered.

In the example described here, said value quantifying the effect of said optical filter quantifies the reduction of the rate of apoptosis of the retinal cells linked to blue light exposure, as explained in more details below.

More precisely, the set of experimental data comprises here measured values of a photoprotective potency PP defined as the benefit induced by the filter regarding apoptotic cell death, i.e. the measured apoptosis reduction induced by the filter as compared without any filter.

This photoprotective potency PP is here determined as the difference between the light-induced apoptosis rate without any filter $A_{NF}$ and the light-induced apoptosis rate with the filter $A_F$ divided by the light-induced apoptosis rate without any filter $A_{NF}$:

$$PP=(A_{NF}-A_F)/A_{NF}.$$

The measured photoprotective potency PP values are plotted against the corresponding spectral feature of the corresponding reference optical filters.

For example, FIG. 3 is a graph showing the measured photoprotective potency PP values (dots), plotted against the spectral feature 100−AvT_tot(420-450 nm) of the reference filters, AvT_tot(420-450 nm) being the average transmittance of the reference optical filters over the range 420-450 nm, and the curve of the corresponding mathematical function determined by fitting the experimental data (line).

FIG. 4 is a graph showing the measured photoprotective potency PP values (dots), plotted against the average weighted transmittance over the range 400-450 nm BVC (400-450 nm) of the reference optical filters, and the curve of the corresponding mathematical function determined by fitting the experimental data (line).

FIG. 5 is a graph showing the measured photoprotective potency PP values (dots), plotted against the transmittance at 410 nm AvT(410 nm) of the reference optical filters, and the curve of the corresponding mathematical function determined by fitting the experimental data (line).

Similar graphs were established for transmittances AvT (400 nm), AvT(420 nm), AvT(430 nm), AvT(440 nm) and AvT(450 nm) at respectively 400, 420, 430, 440 and 450 nm.

The mathematical function is determined by a regression analysis, for example using the least-square method. The method of least squares is a procedure to determine the best fit line to data.

In the example described here, where said value quantifying the effect of said optical filter is related to the reaction of the outer retina to blue light, said predetermined function comprises a polynomial of order at least 2.

More precisely, the mathematical functions whose curve is shown on FIGS. 3 and 4 are polynomials of order 3 and the mathematical function whose curve is shown on FIG. 5 is a polynomial of order 2.

The mathematical function PP1 determined based on the data plotted on FIG. 3 is the following:

$$PP1=PP(100\%-AvT\_tot(420\text{-}450\ nm))=4.0309x^3-4.9443x^2+2.3583x,$$

with a coefficient of determination $R^2=0.98$ (x is here 100%−AvT_tot(420-450 nm)).

Such data have been measured on the white light box as described later.

The mathematical function PP2 determined based on the data plotted on FIG. 4 is the following:

$$PP2=PP(BVC(400\text{-}450\ nm))=6.5008x^3-6.3084x^2+2.3115x$$

with a coefficient of determination $R^2=0.92$ (x is here BVC(400-450 nm)).

Such data have been measured on the white light box as described later.

The mathematical function PP3 determined based on the data plotted on FIG. 5 is the following:

$$PP3=PP_{410\ nm}=PP(AvT(410\ nm))=-0.6719x^2-0.2811x+0.9818,$$

with a coefficient of determination $R^2=0.98$ (x is here AvT(410 nm)).

Such data have been measured on the blue light box as described later.

This function PP3 is obtained here for transmittance values higher than 35%, preferably higher than 50% at corresponding wavelength 410 nm.

Mathematical functions PP4, PP5, PP6, PP7 and PP8 may also be determined based on the similar graphs for average transmittances at 400, 420, 430, 440 and 450 nm obtained by measurements in the blue light box as described hereafter.

$$PP4=PP_{400\ nm}=PP(AvT(400\ nm))=-1.2718x^2+0.3225x+1.0065,$$

with a coefficient of determination $R^2=0.82$ (x is here AvT(400 nm));

$$PP5=PP_{420\ nm}=PP(AvT(420\ nm))=-0.3334x^2-0.6093x+1.0438,$$

with a coefficient of determination $R^2=0.93$ (x is here AvT(420 nm));

$$PP6=PP_{430\ nm}=PP(AvT(430\ nm))=-1.4849x^2+0.1921x+0.9982,$$

with a coefficient of determination $R^2=0.91$ (x is here AvT(430 nm));

$$PP7=PP_{440\ nm}=PP(AvT(440\ nm))=-0.3178x^2-0.6689x+1.0091,$$

with a coefficient of determination $R^2=0.96$ (x is here AvT(440 nm));

$$PP8=PP_{450\ nm}=PP(AvT(450\ nm))=-0.2978x^2-0.8089x+1.0000,$$

with a coefficient of determination $R^2=0.80$ (x is here AvT(450 nm)).

Finally, one calculates a weighted average function PPWS of the photoprotective potency depending on the average transmittances at 400, 410, 420, 430, 440 and 450 nm, based on the weighted average of the mathematical functions calculated for determining the photoprotective potency depending on the transmittance of the filter at each wavelength PP(AvT(λ)) as:

$$PPWS(AvT(\lambda), \lambda = 400, 410, 420, 430, 440, 450 \text{ nm}) ==$$

$$PPWS(PP4, PP3, PP5, PP6, PP7, PP8) = \frac{\sum_{\lambda=400}^{450} PP(AvT(\lambda)) \times B(\lambda)}{\sum_{\lambda=400}^{450} B(\lambda)}$$

The weighting factors are here the values of one of the blue-hazard functions defined before, for example B1 or B2, at the considered wavelength.

It has been found that using the functions PP(AvT(λ)) from PP3 to PP8, in combination with PP1 and/or PP2, allows distinguishing the photoprotective potency of filters with different spectral profiles, for example, bandstop versus longpass, but with same values for average transmittance over the whole wavelength range 420 to 450 nm AvT_tot (420-450 nm) and/or for weighted average transmittance over the wavelength range 400-450 nm BVC(400-450 nm).

In another example, the measured photoprotective potency values are plotted against the spectral feature 100%−AvT_tot(400-455 nm) of the reference filters.

The mathematical function determined is then PP9=PP(100%-AvT_tot(400-455 nm))=9.2793$x^3$−8.4903$x^2$+2.8067x, (x is here 100%-AvT_tot(400-455 nm)).

As described in more details below, said predetermined function may comprise an average or weighted average of a plurality of mathematical functions determined by fitting the experimental data.

For example, the mathematical function may be defined as an average, preferably weighted, of at least two of the PP1, PP2 and PPWS mathematical functions defined above.

For example, the mathematical function taking into account the average transmittance over the range 420-450 nm and the weighted average transmittance over 400-450 nm can be expressed as:

PP10=PP(100%−*AvT_tot*(420-450 nm),BVC(400-450 nm))=mean(PP(100%-*Avt_tot*(420-450 nm));PP(BVC(400-450 nm))).

It may also be a weighted average of these two mathematical functions, such as:

PP11=PP(100%−*AvT_tot*(420-450 nm),BVC(400-450 nm))=0.16*PP(BVC(400-450 nm))+0.84*PP(100%−*AvT_tot*(420-450 nm))

using best fit by least-square method.

This function proved to give good and robust results for a large sample of filters with very different filtering rates in blue-violet range, at all average transmittance (weighted or not) value comprised between 0 and 100%.

For PP mathematical functions taking into account the average transmittance over the range 420-450 nm, the weighted average transmittance over the range 400-450 nm and one or more of the average transmittances over 1 nm bands centered on 400, 410, 420, 430, 440, 450 nm wavelength, an example of a weighted PP mathematical function is:

PP12=PP[BVC(400-450 nm),100%−*AvT_tot*(420-450 nm),*Av_T*((λm), λm=400,410,420,430,440,450 nm)]=0.20*PP(100%−*AvT_tot*(420-450 nm))+0.10*PP(BVC(400-450 nm)+0.70*PPWS(*AvT*(λm),λm=400,410,420,430,440,450 nm)), using best fit by least-square method.

It has been found that this function is especially useful to distinguish or compare band-stop filters and long-pass filters. Indeed, two different optical filters, such as filters A (longpass) and B (bandstop), may exhibit the same average transmittance (weighted or not) i.e. same value of weighted average transmittance BVC and/or average transmittance AvT_tot over a given wavelength range, and still have different photoprotective potency.

For example, comparing filters A and B, they have the same average transmittance AvT_tot(420-450 nm)=84% and the same BVC(400-450 nm)=19%, but different photoprotective potency as measured: 23% for filter A compared to 30% for filter B (see following table).

Thanks to these functions, according to the invention, it is possible to quantify the value of the photoprotective potency of any filter by calculating it based on one of these functions and the corresponding spectral feature determined for this filter.

Finally, it would also be possible to use a weighted mean of the photoprotective potency obtained with average transmittance over the range 420-450 nm and one of the photoprotective potency obtained with the single transmittance at respectively 400, 410, 420, 430, 440, 450 nm wavelength and in this case, an example of a weighted PP mathematical function is:

PP13=PP(100%−*AvT_tot*(420-450 nm),*AvT*((λm), λm=400,410,420,430,440,450 nm))=0.48*PP(100%−*AvT_tot*(420-450 nm))+0.52*PPWS(*AvT*(λm),λm=400,410,420,430,440,450 nm).

This function gives especially good results for average transmittance in the blue range 400-450 nm and/or 420-450 nm higher than 50%.

Different functions may be used for different transmittance range.

The photoprotective potency PP value looked-for is the value of the function when the optical parameter is equal to the spectral feature determined.

In practice, it is possible for example to determine the average transmittance of a filter in a simple way, by measuring its transmittance over the spectral range looked-for, for example on 420-450 nm range, and integrating it.

The photoprotective potency PP value looked-for is the value of the function PP(100%−AvT_tot(420-450 nm)) at the abscissa 100%−AvT_tot(420-450 nm).

As the measured photoprotective potency is a biological effect with threshold phenomenon, measured PP=0% can be obtained for filtering rates slightly higher than 0%. As the measured photoprotective potency is a biological effect with saturation phenomenon, measured PP=100% can be obtained for filtering rates lower than 100%. Thus, all the formula given as examples above are valid for filtering rates giving calculated PP between 0% and 100%. For filtering rates giving PP values outside the range [0%;100%], the attributed PP values will be 0% for calculated PP having negative results or 100% for calculated PP higher than 100%.

The filtering rate of a filter at a predetermined wavelength is defined as 100% minus the transmittance value of the filter at this wavelength.

For example, the following results are obtained for filters A to F, as summarized in the following table. They are to be compared with the measured photoprotective potency, obtained by experimental in vitro tests as described below.

| Filter | PP BVC(400-450 nm) | PP(100% − AvT_tot(420-450 nm)) | PP11* | PP13** | PP12*** | PP measured |
|---|---|---|---|---|---|---|
| A | 26% | 27% | 27% | 25% | 24% | 23% |
| B | 26% | 27% | 27% | 27% | 27% | 30% |
| C | 26% | 30% | 29% | 27% | 26% | 25% |
| D | 32% | 36% | 36% | 41% | 42% | 41% |
| E | 30% | 22% | 24% | 25% | 25% | 24% |
| F | 89% | 88% | 88% | 84% | 83% | 88% |

*PP11 = 0.16*PP(BVC(400-450 nm)) + 0.84*PP(100% − AvT_tot(420-450 nm))
**PP13 = 0.48*PP(100% − AvT_tot(420-450 nm)) + 0.52* PPWS(AvT(λm), λm = 400, 410, 420, 430, 440, 450 nm)
***PP12 = 0.2*PP(100% − AvT_tot(420-450 nm)) + 0.10*PP(BVC(400-450 nm) + 0.70* PPWS(AvT(λm), λm = 400, 410, 420, 430, 440, 450 nm).

The functions thus give calculated values of the photoprotective potency that are very close to the measured values. Most of these theoretical values allow efficient comparison of the optical filters A to F regarding the photoprotective potency.

The photoprotective potency of any filter, as filters A to F, may thus be determined very easily and quickly thanks to the method according to the invention.

Surprisingly, the method using average transmission AvT in the blue range of interest, and especially AvT_tot(420-450 nm) as a sole parameter gives better global results (with respect to PP measured) than using the BVC parameter, even if the BVC parameter is weighted by the blue light hazard coefficients.

Calculation using AvT_tot(420-450 nm) is a robust method and can be used for a large number of filters whatever their transmission curve/vs wavelength.

It has been found that the model using AvT_tot(420-450 nm), BVC(400-450 nm) and AvT(λm) (using transmission value or weighted transmission values for certain specific wavelengths in the considered blue range)(as defined before) can be used preferably with low level of filtering in the blue wavelength range (AvT_tot(420-450 nm) lower than 50%). This kind of calculation is particularly adapted to determine the photoprotective potency of ophthalmic lenses that have low filtering in the blue range (for protection against blue light) and that can be used in permanent wear, with a minimum impact on the perception of the wearer because they have a high level of transparency and a low level of yellowness (colorimetric coefficient b* as defined in the CIE (1976) L*a*b* international colorimetric system that is lower than or equal to 4 for light transmitted by the whole lens system).

The colorimetric coefficients of the optical articles whose PP is going to be measure in the international colorimetric CIE L*a*b* are calculated between 380 and 780 nm, taking the standard illuminant D 65 and the standard observer 10°.

We will now describe in more details how the function may be determined. According to the invention, the method for determining the function for determining the value quantifying an effect of an optical filter on a parameter, preferably a biological parameter, linked to the eye based on at least one spectral feature of this optical filter comprises the following steps:

measuring said value quantifying the effect of each reference filter of a set of reference filters blocking at least partially the transmission of light over said predetermined wavelength range, by comparing the negative action of light on said parameter (preferably biological) linked to the eye illuminated through each reference filter and illuminated directly without any filter, determining, for each reference filter, one or more spectral feature(s) of this reference filter related to its transmittance at at least one wavelength in said predetermined wavelengths range, determining said function as the mathematical function whose curve fits the measured values quantifying the effect of the reference filters plotted against the spectral feature(s) of the corresponding reference filter.

In the example described above, photoprotective potency PP of each reference filter is determined as the decrease in cell death by apoptosis obtained with the optical filter compared to no filter on an in vitro model of retinal photo-ageing or of ARMD.

This in vitro model comprises A2E-loaded retinal pigment epithelium cells, as described in details in the paper titled "Phototoxic Action Spectrum on a retinal Pigment Epithelium model of Age-Related macular Degeneration Exposed to Sunlight Normalized Conditions", by author Arnault, Barrau et al. published on Aug. 23, 2013 in the peer-reviewed scientific Journal PlosOne (available on plosone.org website).

A2E is a chemical photosensitive derivative of the visual pigment. A2E is N-retinylidene-N-retidylethanolamine.

As described in the previously cited paper from Arnault et al., primary cultures of porcine retinal pigment epithelium cells were incubated for 6 hours with different A2E concentrations and exposed for 18 hours to moderate irradiance illumination.

They were illuminated either by one of several 10 nm-wide illumination bands centered from 400 to 450 nm in 10 nm increments with or without one of the reference filters (400, 410, 420, 430, 440, 450 nm), or by a broadband visible light spectrum with or without one of the reference filters. In all experiments, some cells were maintained in darkness as a negative control.

These cultures are placed in the wells of a cell-well plate.

Subdivisions of this cell-well plate are simultaneously illuminated by the 10 nm wide bands, the white light or left in darkness, thanks to optical fibers.

The reference optical filters can be fixed on the optical pathway of the light coming out of the fibers, before it reaches the cells.

After light exposure, all cells are examined after 6-hour rest in darkness.

Their apoptosis is assessed using the Apotox-Glo Triplex commercial assay.

Two cell illumination systems are used to illuminate the cell.

The first system, called white light box, is an adjustable and programmable illumination system within the visible range. The system is adapted to generate programmable and variable spectra (narrow or broadband) and irradiances within the visible range. The cell illumination system is adapted to deliver any desired spectrum within the visible range. Thus, it is possible to mimic daylight spectra, but also warm-white or cold-white LEDs spectra, or fluorescent, incandescent spectra, or even quasi-monochromatic light. Here, the white light box is for instance used for broadband visible light within 400-600 nm.

The light source is for example a high-power Xenon lamp source, 1000 W (Cermax). The source emits 106 W in the visible range. Commercially available liquid filter and hot mirror (Edmund Optics) are used to get rid of infrared radiations. Hosing fittings are included with the liquid filter for coupling to the filter's external chamber. External cooling is required to remove the energy absorbed by the distilled water. For external cooling, tap water or water from a recirculating cooler can be used (AMS Technologies).

Focusing optics (Edmund Optics) focus light exiting the source onto a slit.

The use of a spectrally dispersing element and of a commercially available adjustable digital micro-mirror devices (DMD)(Texas Instruments) allows to mimic any desired spectrum in the visible range, narrow and broadband with a spectral resolution varying between 2 to 15 nm depending on the slit size (300 μm to 2 mm). Focusing optics gather all the spectral elements in a liquid light guide Thorlabs) with a numerical aperture NA=0.56, which gives a strong divergent light beam with an angular cone of about 70°.

The illumination system also comprises successive collimation means (Edmund Optics) for collimating the light output from the liquid light guide and beam splitters with predetermined reflection/transmittance coefficients (Edmund Optics) for separating light in four to five distinct fibered pathways composed of liquid light guides (Thorlabs).

Finally, the liquid light guides spread light into commercially available silica homogenizing rods (Edmund Optics) for homogenizing light onto illuminated subdivisions of the 96-well plate.

The 96-well plate containing the cells is divided into several subdivisions (6 to 9 subdivisions, 35×17 mm$^2$ i.e. 8 wells or 35×35 mm$^2$ i.e. 16 wells each).

For measuring the photoprotective potency PP in white light box, for broadband visible light, all subdivisions of the 96-well plate except one are simultaneously exposed to the same broadband retinal solar spectrum within 400-600 nm during 18 hours. One subdivision remains in darkness (negative control). Reference optical filters are fixed in front of some of the illuminated subdivisions, between cells and light. At least one illuminated subdivision remains without any filter (positive control).

The second system is a blue light illumination system, called blue-light box, and is described in the paper titled "Phototoxic Action Spectrum on a retinal Pigment Epithelium model of Age-Related macular Degeneration Exposed to Sunlight Normalized Conditions", by authors Arnault, Barrau et al. published on Aug. 23, 2013 in the peer-reviewed scientific journal PlosOne (available on plosone.org website. The blue-light box is adapted to expose cells to narrow bands (10 nm wide) within the blue-green spectral range 390-520 nm in 10 nm increments.

For measuring the photoprotective potency PP in blue light box, for 10-nm wide blue illumination bands, several subdivisions of the 96-well plate are simultaneously exposed to one of the 10 nm illumination band, within 400 to 450 nm with or without the reference optical filters, during 18 hours.

The photoprotective effect PP of the reference optical filters was first measured with the white light box to mimic polychromatic light conditions as in real life. The obtained data were used to establish the mathematical functions between PP measured in white light box and the averaged transmittance values of the optical filters, BVC and 100%–AvT_tot for different wavelength ranges.

For filters with BVC(400-450 nm) and/or 100%–AvT_tot (420-450 nm) averaged filtering rates inferior to 50% and with very close or equal BVC and 100%–AvT_tot(420-450 nm) but with different spectral profiles (bandstop versus long-pass as for filters B and A), the photoprotective effect PP was additionally measured with the blue light box to be able to determine the photoprotective effect of each narrow blue illumination band within 400-450 nm, and thus to be able to distinguish optical filters with close photoprotection. In that case, new parameters can be advantageously added to the model, such as the transmittance at specific wavelengths AvT(λm).

For each reference filter, and for a fixed A2E concentration in the cells, the following was measured:
the rate $A_1$ of cell death by apoptosis with the reference filter (averaged on several wells, at least 3 wells);
the rate $A_2$ of apoptosis without any filter (also averaged on several wells, at least 3 wells).

For each measured rate, the rate of apoptosis in darkness $A_D$ (negative control) is subtracted.

The light-induced apoptosis rate with each reference filter is thus obtained $A_F=A_1-A_D$.

The light-induced apoptosis rate without any filter $A_{NF}=A_2-A_D$ is also obtained.

Then, the photoprotective potency is calculated as PP= $(A_{NF}-A_F)/A_{NF}$.

The measured photoprotective potency of filters A to F may also be determined according to this method for comparison with the photoprotective potency determined thanks to the method according to the invention.

The device for determining a value quantifying the effect of an optical filter on a parameter linked to an eye, this optical filter blocking at least partially the transmission of light over a predetermined wavelength range, according to the invention comprises:
a device for providing at least one spectral feature of the optical filter related to the transmittance of this optical filter at at least one wavelength in said predetermined wavelength range, and
a calculation unit programmed to determine the value quantifying the effect of the optical filter on said parameter by calculating it as a function of said at least one spectral feature of the optical filter provided in step a).

This device is adapted to perform the method according to the invention, as described before.

As mentioned, the device for providing the spectral feature may comprise a spectrometer for measuring the transmittance spectrum of the filter and computer means programmed to deduce the spectral feature from this measured spectrum, or a database having in memory the corresponding transmittance spectrum with computer means programmed to deduce the spectral feature from this memorized spectrum. The device for providing the spectral feature may also comprise the spectral feature looked for.

The calculation unit comprises computer means programmed to determine the value quantifying the effect of the optical filter on said parameter by calculating it as a function of said at least one spectral feature of the optical filter provided in step a) according to one of the embodiment of the method described before.

The invention claimed is:
1. A computer-implemented method for quantifying an effect of an optical filter on a parameter linked to an eye comprising determining a value quantifying said effect of said optical filter on said parameter linked to said eye, the optical filter blocking at least partially the transmission of light over a predetermined wavelength range, comprising the following steps:

a) providing at least one spectral feature of the optical filter related to the transmittance of the optical filter at at least one wavelength in said predetermined wavelength range;

collecting experimental data comprising a set of measured values quantifying the effect of reference filters of a set of reference filters associated to the corresponding spectral feature of the reference optical filter considered by:

measuring said value quantifying the effect of each reference filter of a set of reference filters blocking at least partially the transmission of light over said predetermined wavelength range by comparing the negative action of light on said parameter of the eye illuminated through each reference filter and illuminated directly without any filter; and determining a mathematical function whose curve fits said experimental data; and b) quantifying the effect of the optical filter on said parameter by calculating said value based on said function of said at least one spectral feature of the optical filter provided in step a), the effect of the optical filter corresponding to a photoprotective effect of the optical filter against the negative action of blue light on the parameter linked to the eye.

2. The method of claim 1, wherein, in step a), said at least one spectral feature provided comprises an average transmittance over the whole predetermined wavelength range and/or over a reduced wavelength range centered on a particular wavelength of said predetermined wavelength range, and/or a weighted average transmittance over the whole predetermined wavelength range and/or over a reduced wavelength range centered on a particular wavelength of said predetermined wavelength range.

3. The method of claim 1, wherein, in step a), a plurality of spectral features of said optical filter is provided, comprising at least an average transmittance over the whole predetermined wavelength range, and average transmittances over reduced wavelength ranges centered on different wavelengths of said predetermined wavelength range.

4. The method of claim 1, wherein, in step a), said at least one spectral feature provided comprises a weighted average transmittance over the whole predetermined wavelength range or over a reduced wavelength range centered on a particular wavelength of said predetermined wavelength range, each value of the transmittance of the optical filter at a given wavelength being weighted by the corresponding value at the same given wavelength of an action spectrum of light in relation with the parameter linked to the eye.

5. The method of claim 1, wherein said wavelength range is comprised between 380 and 500 nanometers.

6. The method of claim 5, wherein said wavelength range is comprised between 400 and 455 nanometers.

7. The method of claim 6, wherein said wavelength range is comprised between 400 and 450 nm.

8. The method of claim 5, wherein said wavelength range is comprised between 415 and 455 nanometers.

9. The method of claim 8, wherein said wavelength range is comprised between 420 and 450 nanometers.

10. The method of claim 5, wherein said value quantifying the effect of said optical filter quantifies the reaction of the eye to blue light.

11. The method of claim 5, wherein, in step a), said at least one spectral feature provided is a weighted average transmittance, each value of the transmittance of the filter at a given wavelength taken into account in this weighted average being weighted by a factor determined as the value of the blue light hazard function at this given wavelength.

12. The method of claim 1, wherein, in step b), the value quantifying the effect of the optical filter on said parameter linked to the eye is calculated using a predetermined function associating said parameter linked to the eye to an optical parameter relative to the transmission of light to said eye.

13. The method of claim 12, wherein, in step b), the parameter is a biological parameter and said predetermined function takes into account a set of experimental data comprising values of said biological parameter measured in vitro on eye cells or in vivo on an animal eye after illumination of the eye by light comprising different ranges of wavelengths by putting optical filters in between light and cells.

14. The method of claim 12, wherein, in step a), said value quantifying the effect of said optical filter is related to the reaction of the eye to blue light and, in step b), said predetermined function comprises a polynomial of order at least 2.

15. The method of claim 14, wherein said predetermined function comprises an average or weighted average of a plurality of mathematical functions determined by fitting the experimental data.

16. The method of claim 15, wherein, in step a), said at least one spectral feature provided comprises an average transmittance over a first predetermined wavelength range and a weighted average transmittance over a second predetermined wavelength range, and in step b), said predetermined function comprises an average or weighted average of two mathematical functions, each associating said parameter linked to the eye to one of the average transmittance over the first predetermined wavelength range and weighted average transmittance over the second predetermined wavelength range.

17. The method of claim 1, wherein said parameter is a biological parameter related to the rate of apoptosis of the retinal pigment epithelium cells, and said value quantifying the effect of said optical filter quantifies the reduction of the rate of apoptosis of the eye cells linked to blue light exposure.

18. The method of claim 1, wherein:

for each reference filter, one or more spectral feature(s) of the reference filter related to its transmittance at at least one wavelength in said predetermined wavelengths range are determined; and determining said function is achieved by determining a mathematical function the curve of which fits the measured values quantifying the effect of the reference filters as a function of the spectral feature(s) of the corresponding reference filter.

19. A device for quantifying an effect of an optical filter on a parameter linked to an eye by determining a value quantifying an effect of an optical filter on a parameter linked to an eye, the optical filter blocking at least partially the transmission of light over a predetermined wavelength range, the device configured to:

provide at least one spectral feature of the optical filter related to the transmittance of the optical filter at at least one wavelength in said predetermined wavelength range; and the device including:

a spectrometer for measuring the transmittance spectrum of the filter, the spectrometer configured to measure said value quantifying the effect of each reference filter of a set of reference filters blocking at least partially the transmission of light over said predetermined wavelength range by comparing the negative action of light on said parameter of the eye illuminated through each reference filter and illuminated directly without any filter; and a computer programmed to deduce the spectral feature from this measured spectrum, or a database having in memory the corresponding transmittance spectrum with a computer programmed to deduce the spectral feature from this memorized spectrum; and a computer programmed to determine the value quantifying the effect of the optical filter on said parameter by calculating it as a function of said at least one spectral feature of the optical filter provided by said spectrometer or database with a computer, the effect of the optical filter corresponding to a photoprotective effect of the optical filter against the negative action of blue light on the parameter linked to the eye.

20. A computer-implemented method for quantifying an effect of an optical filter on a parameter linked to an eye comprising determining a value quantifying said effect of said optical filter on said parameter linked to said eye, the optical filter blocking at least partially the transmission of light over a predetermined wavelength range, comprising the following steps:

a) providing at least one spectral feature of the optical filter related to the transmittance of the optical filter at at least one wavelength in said predetermined wavelength range;

collecting experimental data comprising a set of measured values quantifying the effect of reference filters of a set of reference optical filters associated to the corresponding spectral feature of the reference optical filter considered by:

measuring said value quantifying the effect of each reference filter of a set of reference filters blocking at least partially the transmission of light over said predetermined wavelength range, by:

comparing the negative action of light on said parameter of the eye illuminated through each reference optical filter and illuminated directly without any reference optical filter, and determining, for each reference filter, one or more spectral feature(s) of this reference filter related to its transmittance at at least one wavelength in said predetermined wavelengths range;

determining a mathematical function whose curve fits said experimental data, by determining said mathematical function as being the one whose curve fits the measured values quantifying the effect of the reference filters as a function of the spectral feature(s) of the corresponding reference filter; and b) quantifying the effect of the optical filter on said parameter by calculating said value based on said function of said at least one spectral feature of the optical filter provided in step a), the effect of the optical filter corresponding to a photoprotective effect of the optical filter against the negative action of blue light on the parameter linked to the eye.

* * * * *